Figure 11:
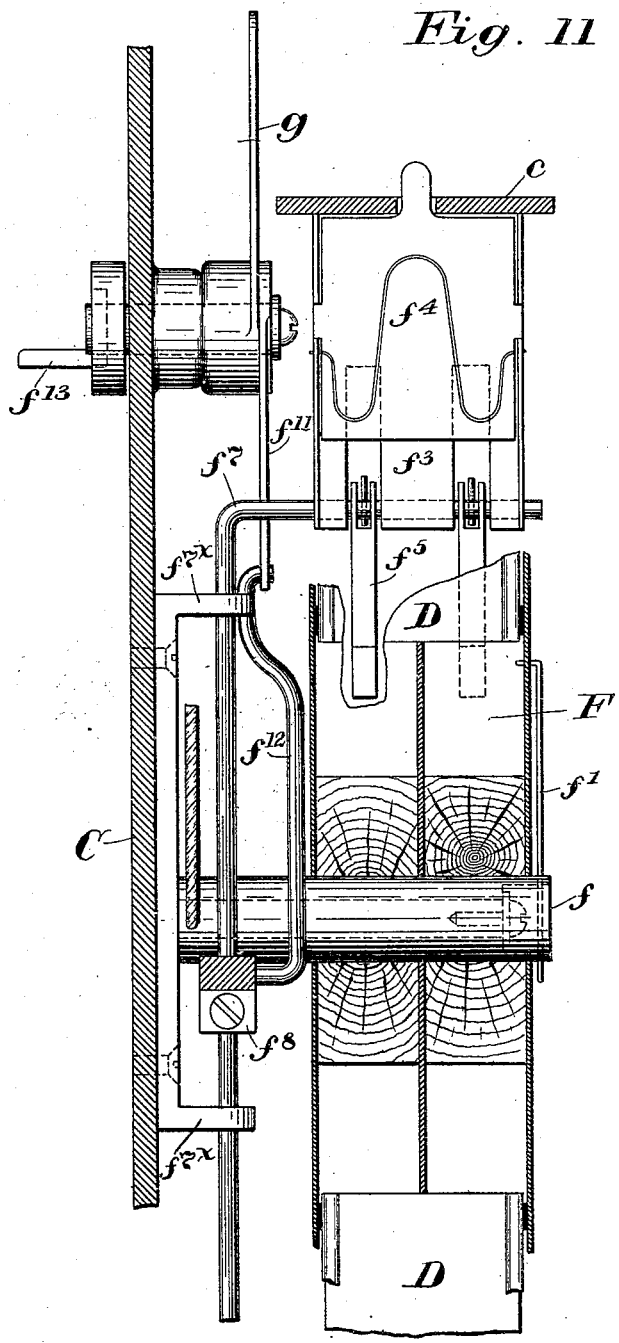

H. H. CUMMINGS.
TARGET PRACTICE APPARATUS.
APPLICATION FILED OCT. 28, 1903.
936,418.
Patented Oct. 12, 1909.
6 SHEETS—SHEET 1.
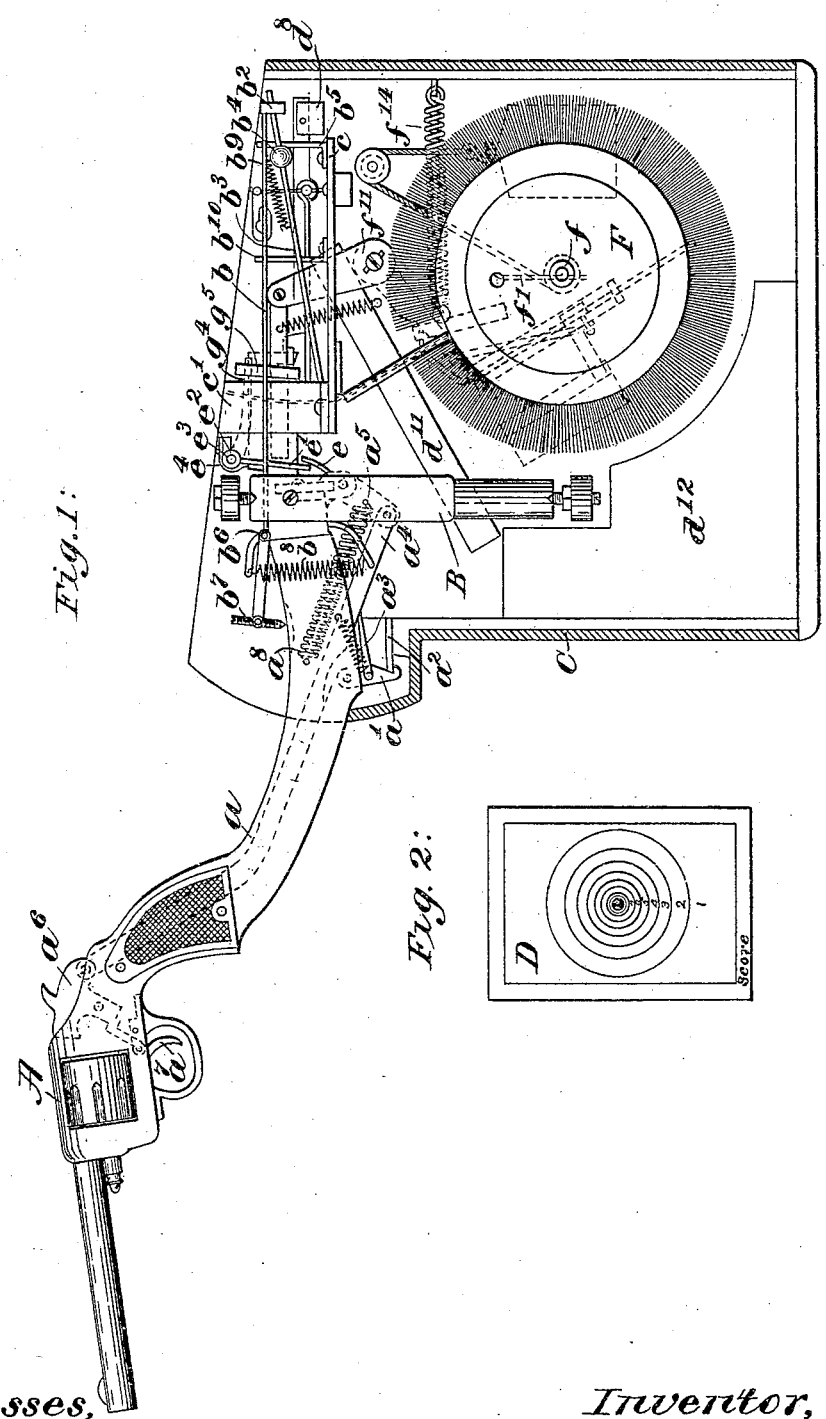
Witnesses,
Horace A. Crossman
Everett S. Emery
Inventor,
Henry H. Cummings
by Emery, Booth & Powell
Att'ys.

H. H. CUMMINGS.
TARGET PRACTICE APPARATUS.
APPLICATION FILED OCT. 28, 1903.
936,418.
Patented Oct. 12, 1909.
6 SHEETS—SHEET 2.
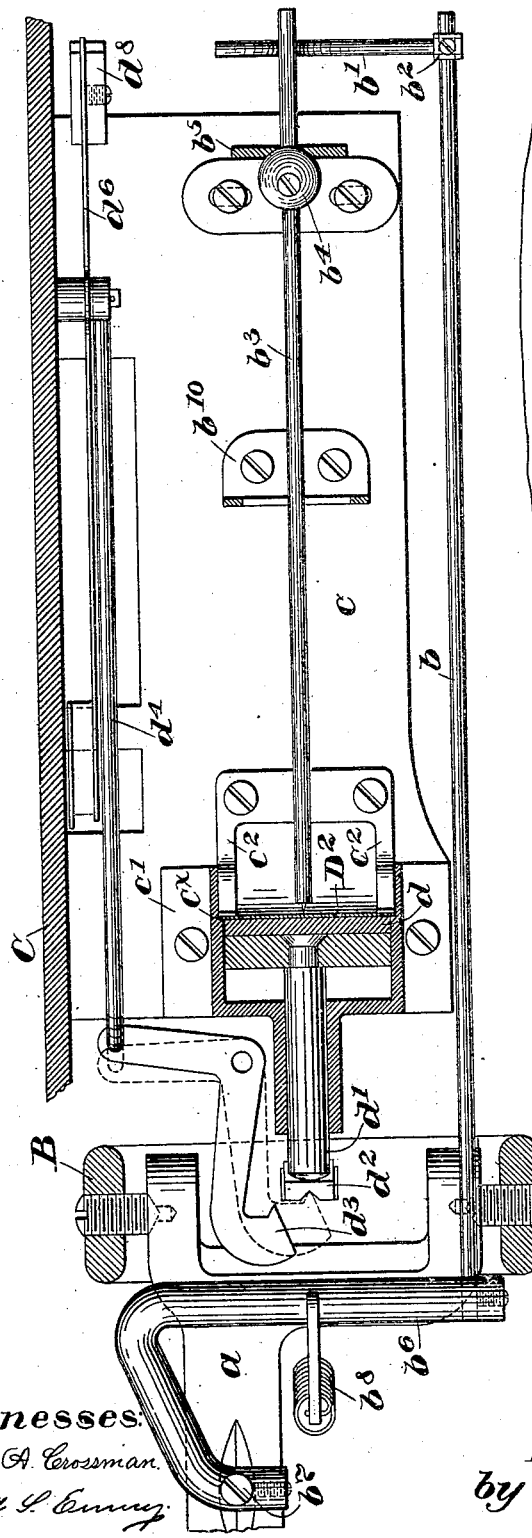
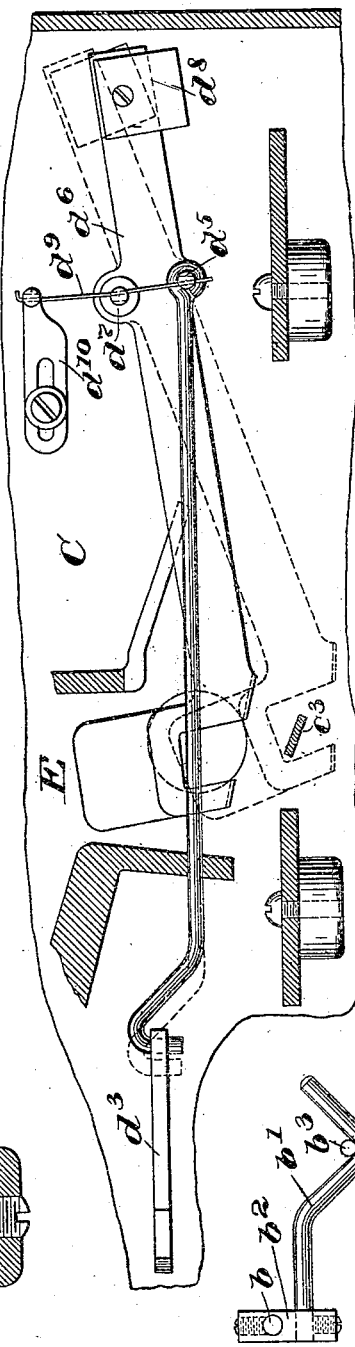
Witnesses:
Horace A. Crossman.
Everett S. Emery
Inventor:
Henry H. Cummings.
by Emery, Booth & Powell
Attys

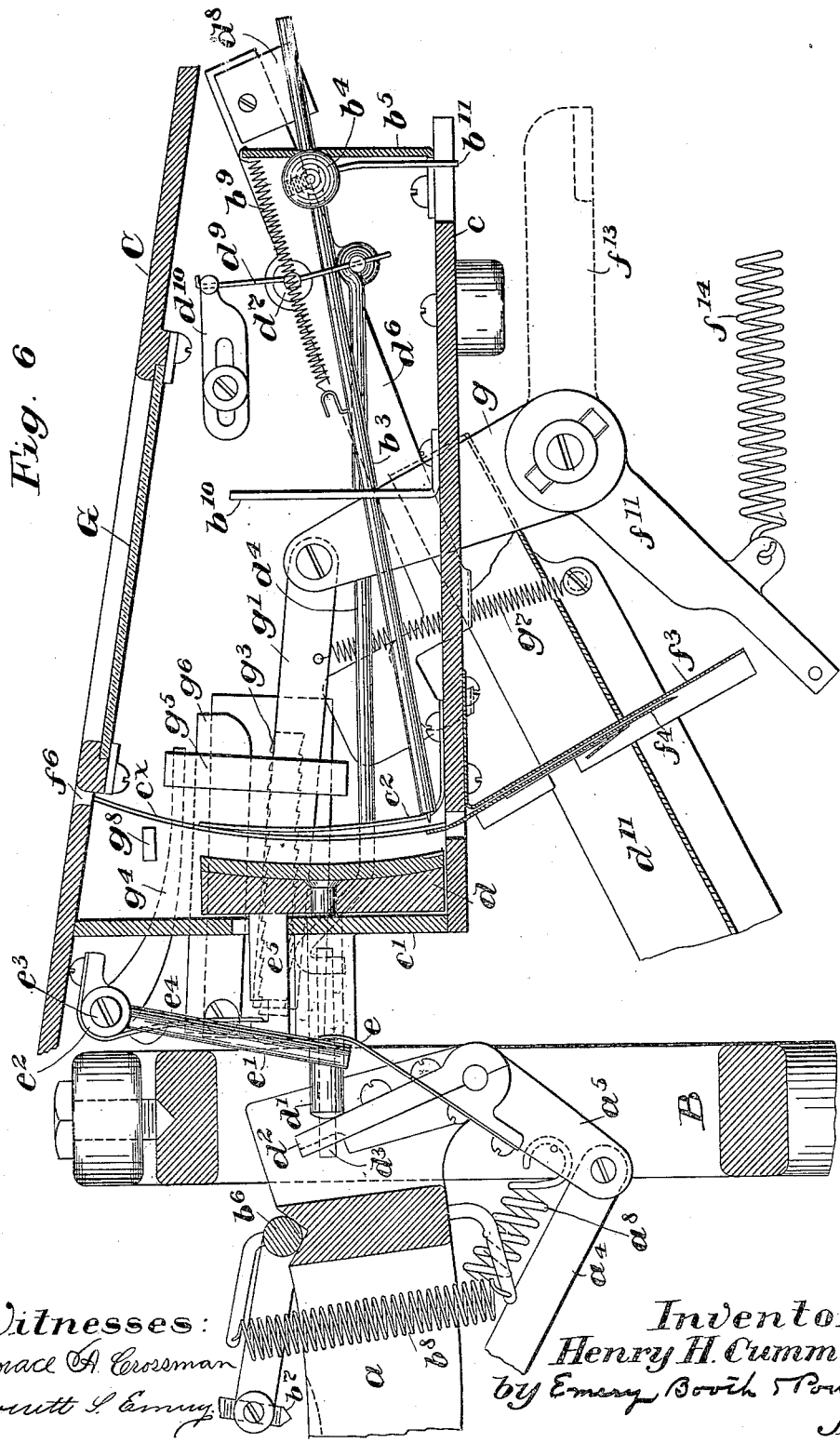

H. H. CUMMINGS.
TARGET PRACTICE APPARATUS.
APPLICATION FILED OCT. 28, 1903.
936,418.
Patented Oct. 12, 1909.
6 SHEETS—SHEET 4.
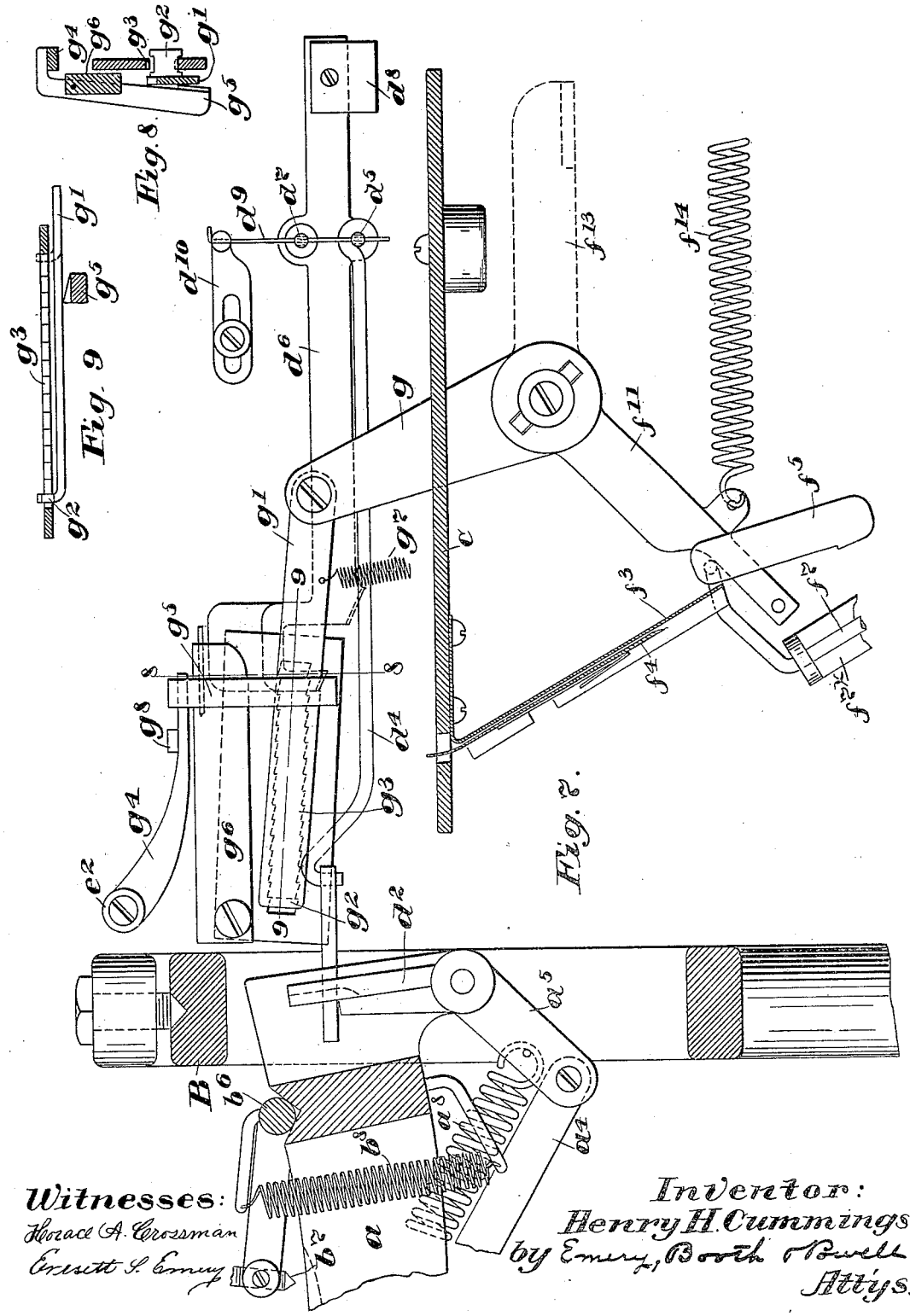
Witnesses:
Horace A. Crossman
Everett S. Emery
Inventor:
Henry H. Cummings.
by Emery, Booth & Powell
Attys.

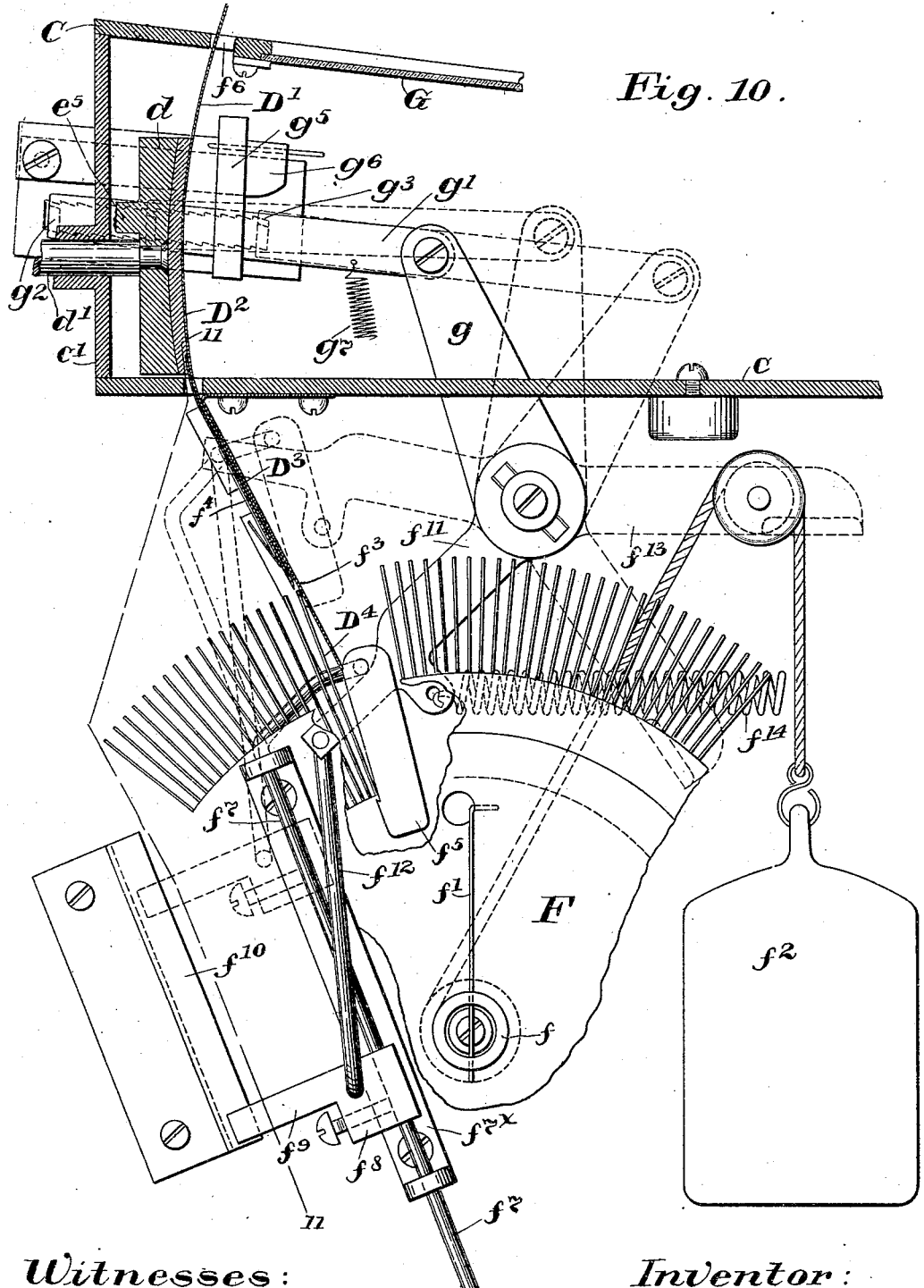

H. H. CUMMINGS.
TARGET PRACTICE APPARATUS.
APPLICATION FILED OCT. 28, 1903.

936,418.

Patented Oct. 12, 1909.
6 SHEETS—SHEET 6.

Witnesses:
Horace A. Crossman
Everett S. Emery

Inventor:
Henry H. Cummings
by Emery, Booth & Powell
Attys.

UNITED STATES PATENT OFFICE.

HENRY H. CUMMINGS, OF MALDEN, MASSACHUSETTS, ASSIGNOR TO SUB-TARGET GUN COMPANY, OF BOSTON, MASSACHUSETTS, A CORPORATION OF MASSACHUSETTS.

TARGET-PRACTICE APPARATUS.

936,418.  Specification of Letters Patent.  Patented Oct. 12, 1909.

Original application filed August 10, 1903, Serial No. 168,907. Divided and this application filed October 28, 1903. Serial No. 178,807.

*To all whom it may concern:*

Be it known that I, HENRY H. CUMMINGS, a citizen of the United States, and resident of Malden, in the county of Middlesex and State of Massachusetts, (whose post-office address is Malden, Massachusetts,) have invented an Improvement in Target-Practice Apparatus, of which the following description, in connection with the accompanying drawings, is a specification, like letters on the drawings representing like parts.

My invention consists of improvements in target practice apparatus, intended for the practice of marksmanship.

I have herein illustrated and described my invention with reference to such an apparatus wherein is employed an aiming device so mounted as to be capable of an aiming movement with reference to a main target and provided with a suitable follower to follow the aiming movement thereof, and also with suitable recording devices to record the follower upon a sub or miniature target at the time of simulated firing, the object therein being the accurate recording of the aim upon the sub-target.

I have herein described my invention in connection with a suitable coin controlled mechanism to permit the movement of the aiming device and the record of the aim thereof only upon the insertion of a coin, check, or other suitable operating member, also suitable target feeding devices for ejecting the used sub-target from the apparatus and delivering the same within the grasp of the marksman, and for placing a fresh sub-target from a target magazine in recording position ready for another record or shot.

I do not herein claim such features of my invention as are concerned exclusively with coin or check controlled mechanism, such claims being made the subject of a co-pending application, Se. No. 168,907, filed August 10, 1903, of which said application the present one is a divisional, filed in accordance with the requirements of the Patent Office.

My invention will be best understood from the following description, taken in connection with the accompanying illustration of the specific embodiment herein selected, while its scope will be more particularly pointed out in the appended claims.

In the drawings,—Figure 1 is a side elevation of one form of my invention with the housing or casing partially removed to show the contained parts; Fig. 2 is a sub or miniature target upon which the aim is recorded; Fig. 3 is a plan view, partially in section, showing the follower connection and the coin operated releasing lever; Fig. 4 is a fragmentary partial section in elevation of the same; Fig. 5 is a detail of the follower connection; Fig. 6 is an elevation, partially in section, of the recording devices and the lever locking means; Fig. 7 is a sectional elevation showing the lever locking devices for locking the feeding mechanism, other parts being removed. Figs. 8 and 9 are sectional detail views taken on the lines 8—8 and 9—9, respectively in Fig. 7; Fig. 10 is a sectional elevation showing the target feeding devices; Fig. 11 is an elevation in section taken on the line 11—11 in Fig. 10.

Referring to Fig. 1, I have shown a coin controlled target practice apparatus having an aiming device, such as the revolver A, provided with the rearwardly extending arm, $a$, secured to the revolver butt, and universally mounted upon a universal support B, carried within and secured to the casing C, which latter may be supported upon a standard or other suitable support of any suitable form or height, but which herein is not shown. The revolver A, is thus supported so as to be capable of a free universal aiming movement, and may be grasped in the hands of the marksman and aimed at any suitable object, such as a distant target. The aiming device, however, is ordinarily secured from aiming movement by the spring catch $a'$, engaging the ledge $a^2$ secured to the casing, which catch, however, is provided with the rearwardly extending finger, $a^3$, spring pressed against the under side of the resetting rod $a^4$, the latter being employed for resetting the recording devices and connecting the bell crank lever $a^5$ and the revolver cock or hammer $a^6$, with which and the trigger $a^7$ the pistol is provided, although in other respects it may either be a dummy device or an actual firearm. The revolver is normally maintained in its uncocked position, as shown in Fig. 1, through the retractile spring $a^8$, secured to the arm $a$, and tending to draw the lever $a^5$ and rod $a^4$ forward to maintain the hammer $a^6$ in its seated position. When the revolver is cocked, the rod $a^4$ forces the lever $a^5$ backward and the finger $a^3$ downward, the latter causing the release of the catch $a'$, the parts being then held in the cocked position and permitting the free aiming movement of the revolver about its universal support until the trigger is pulled.

Connected as hereinafter described to follow the aiming movement of the aiming device when the latter is free, is the rearwardly extending follower rod $b$ within the casing C and provided at its opposite end with the right-angled finger $b'$ (see Figs. 3 and 5), secured thereto in any suitable way, as by the adjustable connection $b^2$. The finger $b'$ is provided with a crooked end, which underlies the rearwardly projecting shank of the recording needle $b^3$. The latter is also capable of universal movement and for that purpose is provided with a spherical bearing $b^4$, seated in an upright bracket $b^5$, secured to a shelf $c$, which latter may be and herein is a part of the casing C. To connect the follower rod $b$ with the revolver arm $a$ the former is secured at its forward end to a cross pin $b^6$ seated in a transverse V-shaped groove Figs. 6 and 7 in the arm $a$, such pin having the end opposite to that secured to the rod $b$, bent forwardly in the irregular manner shown and provided with the vertically adjustable positioning point $b^7$ adapted to center itself in the bottom of a coöperating notch in the arm $a$ when the arm is raised after the revolver has been released by cocking.

After the revolver has been raised, the spring $b^8$ tends to pull the positioning point $b^7$ into the notch in the arm $a$ and there maintain it to cause the following rod $b$ to have at all times when the apparatus is in use a fixed, and the same, position relative to the arm and revolver, so that it follows the aiming movement of the latter and correctly transmits the same through the finger $b'$ to the indicating needle $b^3$. This finger thus constitutes a disengageable connection between the aiming device and aim indicating means of the apparatus and is an important feature of the invention.

As the revolver is raised, the finger $b'$ is correspondingly lowered. As the revolver is lowered, the finger is raised, and as the former is shifted to one side or the other, the finger undergoes a proportional opposite movement. During all movements of the follower, however, the needle is caused to remain seated in the crook of the finger $b'$, through the tension spring $b^9$, and the needle point, therefore, reproduces with reference to the sub-target the exact aiming movement of the revolver with reference to the main target, although to a different and greater degree. The sub or miniature target D Fig. 2 is secured in a suitable target holder directly in front of the needle point and at the time of simulated firing is forced as hereafter described against the needle point to permanently record the position of the needle and therefore the aim of the revolver at that time.

It is desirable to restrain the movement of the recording needle $b^3$ and limit its range to the face of the sub-target, while permitting at all times free movement of the revolver. To permit of this, a limiting frame $b^{10}$ is provided, through which the needle passes, acting to limit the movement of the needle when the revolver undergoes excessive deflection in any direction upon its universal support. The connection between the finger $b'$ and the needle, and between the follower $b$ and the revolver arm $a$, provides a yielding connection between the needle and the revolver to permit this excess of movement of the latter over the former. Thus, when the revolver is moved laterally in either direction, so as to bring the needle against the limiting frame, the unseating of the pin $b^7$ from its coöperating slot in the arm $a$, or the unseating of the needle shank from the crooked finger $b'$, permits the further unimpeded movement of the revolver itself. An excessive upward deflection of the revolver causes merely the withdrawal of the finger $b'$ from the needle shank after contact between the needle and the limiting frame has taken place, while an excessive downward deflection thereof causes simply the withdrawal of the positioning point $b^7$ from its coöperating slot, which, it will be observed, is the normal condition when the revolver arm is locked, as shown in Figs. 1 and 6.

For an accurate record, it is necessary that the apparatus be accurately adjusted, and that the needle $b^3$ point to the bull's-eye of the sub-target when the revolver or other firearm points to the bull's-eye of the distant target. To effect this, the revolver is first accurately sighted at the bull's-eye of the main target, and when in this position, the needle, if needs be, is adjusted to point also at the bull's-eye of the sub-target, adjustments in a vertical plane being effected by screwing the threaded positioning point $b^7$ in or out; and adjustments in a horizontal plane, by adjusting the point of connection of the finger $b'$ to the following rod $b$. To permit of a determinate accurate adjustment of the needle even though the latter should become bent, the ball $b^4$ has a depending pin $b^{11}$ playing in a slot in the shelf $c$, to prevent rotation of the needle about its axis, though in no way impeding its free movement.

The target $D^2$ when in position is held in two parallel grooves, $c^x$ (Fig. 3), in the target case, $c'$, on the shelf $c$, and between the two spring fingers $c^2$ and the movable target pad $d$, the latter being slidably mounted within the target case $c'$ and provided with the propelling or target pin $d'$ against which presses the target hammer $d^2$ secured to bell crank lever $a^5$.

Referring to Figs. 3 and 4, the former of which shows the recording mechanism in the uncocked condition of the revolver, the target hammer $d^2$ is held locked and therefore likewise the revolver hammer and the target pad $d$, by the pivoted locking catch $d^3$ (then in the position shown in dotted lines, Fig. 3), having an arm secured to the rearwardly extending connecting rod $d^4$. The latter is secured by a pin $d^5$ to the coin-controlled releasing lever, $d^6$, which is pivoted at $d^7$ to the casing C. The releasing lever $d^6$ is provided at its forward end with a coin receptacle beneath a suitable coin slot, E, the latter leading to the upper and outer portion of the casing C, and at its opposite end with a weight $d^8$ to balance the lever about its pivot $d^7$, as shown in Fig. 7, when there is no coin in its receiver.

When a coin is inserted in the slot E and passes into the receiver of the releasing lever $d^6$, the latter is tilted from a horizontal position, not shown in Fig. 4, about its pivot $d^7$ into the full line position shown in Fig. 4, the connecting rod $d^4$ being drawn rearwardly by the retrogression of the lever pin $d^5$, causing thereby the withdrawal of the latch $d^3$ from the hammer $d^2$, the former passing from the dotted to the full line position shown in Fig. 3.

The releasing lever $d^6$ comes to rest in the full line position shown in Fig. 4, where further movement is limited by the action of the spring $d^9$ secured to the adjustable support $d^{10}$, and passing through pivot $d^7$ and the pin $d^5$ with considerable clearance, so as to permit a downward movement of the lever into the full line position shown in Fig. 4 before action of the spring $d^9$ begins. The releasing lever is, however, further depressed by the subsequent cocking of the revolver, which throws the hammer $d^2$ forward against the inclined cam-like surface of the catch $d^3$, pushing the latter out of its path, to force the connecting rod $d^4$ still farther backward and the releasing lever $d^6$ farther downward against the action of the spring $d^9$, an exposed edge of the coin then striking a part $c^3$ of the casing, to cause the discharge of the coin from the receiver of the releasing lever into a suitable slide $d^{11}$, Figs 1 and 6, whence it passes into the main coin receiver $d^{12}$, Fig. 1, near the bottom of the casing, C. The lever $d^6$, relieved of the weight of the coin, tends to return to its normal, horizontal position, assisting the spring $d^9$ in causing the movement of the catch $d^3$ into its locking position as soon as the hammer $d^2$ has been returned to the position shown in Fig. 3 by firing the revolver.

For setting the recording devices, the bell crank lever $a^5$ is provided (Fig. 6) with an upright spring finger $e$, pressing against the depending arm $e'$, secured to a sleeve $e^2$, pivoted at $e^3$, said sleeve having also a depending spring finger $e^4$ engaging a notch in the forwardly projecting slide $e^5$ secured to the target pad $d$. After a coin has been inserted to cause the withdrawal of the catch $d^3$ from the target hammer $d^2$, and when the revolver has been subsequently cocked to pull the hammer $d^2$ back from the target pin $d'$, the spring finger $e$ forces the rod or pin $e'$ forward, together with its attached spring finger $e^4$, the latter causing the withdrawal of the target pad $d$ from the target, or from the position shown in Fig. 10, into the position shown in Fig. 6. After the revolver has been aimed and the trigger pulled in the act of simulated firing, the hammer $d^2$, thereby released, is forced against the target pin $d'$, by the spring $a^8$, throwing the target pad against the target to force the latter against the adjacent point of the recording needle. The target pad is preferably faced with some elastic material, such as rubber or felt, and its forcible impact against the target and the resulting needle puncture therefore causes a permanent record of the aim of the revolver.

After the record has been made, the target may be ejected from the apparatus, and delivered within the grasp of the operator by the following means, which suffice also to present in proper position a fresh target for a new trial of marksmanship. A target holder or magazine, F is provided, of any suitable form, but preferably in the form of a circular or disk holder having pockets for holding a supply of sub-targets in outwardly radiating positions, as shown in Figs. 1 and 10. This holder is rotatably mounted upon a spindle, $f$, to which it is secured by the wire clip $f'$, and by which it is given a constant rotative tendency in a right-handed direction (Fig. 10) by means of the weight $f^2$. Leading downwardly from the target case or holder is a target feeding slot, formed by and between the stationary member $f^3$ and the spring pressed member $f^4$, the former being extended down and in front of a target carried by the holder and the latter terminating in a beveled lip just above the upper target edge, so that as the target is lifted out of the holder by the lifting fingers $f^5$ engaging the exposed under target-edge, it naturally finds its way into the slot into which it is forced by the lifting fingers, the stationary member $f^3$ being slotted, Fig. 11, to permit the lifting of the target into the target slot until it has forced the superposed target, previously in the slot, into its proper position for record within the target holder. The preceding target, as it is forced out of the slot and into the holder, also pushes the target upon which record has been made, through the exterior slot or opening $f^6$ in the upper wall of the casing, where it projects for a portion of its length and may be readily withdrawn by the operator.

The relative position of the targets as they progress from the magazine, is shown in Fig. 10 where D' represents the target just expelled from the machine where it has had imprinted upon it the record of the revolver aim; $D^2$, the target which has forced D' out of position and is itself in position suitable for receiving its record; $D^3$, the target just lifted from the holder into the slot and $D^4$ that target of those remaining in the holder which is next to be lifted.

To raise the lifting fingers and thereby effect proper feeding of the targets, the same are connected to a rod $f^7$, slidably mounted in suitable guide-ways, $f^{7x}$, secured to the casing C. Sliding with the rod $f^7$ and adjustably secured thereto, is the coupling $f^8$, having an overhanging arm $f^9$, sliding on and guided by the guide-piece $f^{10}$, said coupling $f^8$ connecting the sliding rod $f^7$ with one arm of the bell crank $f^{11}$, through the connecting link $f^{12}$. The lever $f^{11}$ is moved with and by the operating lever $f^{13}$, on the outside of the casing C. When the hand lever, $f^{13}$ is depressed, it moves the bell crank lever $f^{11}$, coupling $f^8$, and rod $f^7$, into the dotted line position shown (Fig. 10) causing the lifting fingers $f^5$ to engage that target which is then in position beneath the target slot and raise the same up and into the slot, as described. As the hand lever $f^{13}$ is released, it is withdrawn into its normal position by the spring $f^{14}$, and the target feeding parts, including the lifting fingers $f^5$ are restored to the full line position shown in Fig. 10, the target holder being turned through the weight $f^2$, to bring the next succeeding target into position against the stationary member $f^3$ of the target slot.

In order to prevent an incomplete cycle of operations of the target feeding apparatus, which might occur were the hand lever $f^{13}$ only partially depressed and to therefore compel the completion of the movement when once begun, I have provided means for preventing reverse movement of the operating lever until it has reached the limit of its downward stroke and for preventing any further downward movement after its upward stroke has begun.

Referring to Figs. 7 to 10, inclusive, the lever $f^{11}$, has an upright arm $g$, carrying the substantially horizontal locking rod $g'$, the latter being provided at its end with the pawl $g^2$, engaging the teeth of the double ratchet $g^3$, the latter being so constructed as to permit a forward movement of the pawl upon the lower teeth only, and rearward movement upon the upper teeth, the latter corresponding to a depression of the hand lever, and the former to its upward movement. When the revolver is locked in position and uncocked, awaiting the insertion of a coin, and after the revolver has been cocked and before firing, the target feeding devices, including the hand lever $f^{13}$, are locked, as shown in Fig. 7, by the engagement of the pawl $g^2$, in forward position, with the lower set of ratchet teeth. The cocking of the revolver, however, forcing the depending pin $e'$ on the sleeve $e^2$ forward, as it does, through the spring finger $e$, depresses also a rearwardly extending arm $g^4$, secured to the sleeve $e^2$, and permits the pivotally mounted catch $g^5$, Figs. 7 and 8, to swing in under the lever $g'$, the catch being pivoted upon the swinging arm $g^6$, which is lowered as the arm $g^4$ is depressed. When the revolver is fired, the hammer $d^2$, target rod $d'$, and target pad $d$, are thrown rearwardly, and the spring $e^4$ is put under tension, causing the sleeve $e^2$ and the arm $g^4$ to swing upward, the latter carrying the catch $g^5$ with its swinging arm $g^6$ and lifting the lever $g'$ to cause the pawl $g^2$ to contact with the upper row of teeth in the ratchet $g^3$. The handle $f^{13}$ may then be depressed to actuate the target feed, the locking lever $g'$ and the pawl $g^2$ moving to the rear end of the ratchet $g^3$ through the intermediate position fragmentarily shown in dotted lines in Fig. 10. At the end of this rearward movement the locking lever $g'$ frees itself from the catch $g^5$ (Fig. 9) and is pulled into its lower position through the tension spring $g^7$, to cause engagement between the pawl $g^2$ and the lower set of ratchet teeth. On releasing the pressure on the hand lever $f^{13}$, the reverse movement of the feed mechanism takes place through the spring $f^{14}$, the locking lever $g'$ and pawl $g^3$ moving from the rearward dotted line position shown in Fig. 10 to full line position therein. Thus, it will be seen that at no position in its movement is the locking lever $g'$, capable of a retrograde movement. When the lever $g'$ in its rearward position frees itself from the catch $g^5$, the arm $g^4$ is lifted against the stop $g^8$, where it is held preparatory for subsequent depression when the revolver is again cocked. At the time of firing the revolver, the tension upon the spring $e^4$ which causes the lifting of the pawl $g^2$ against the upper set of ratchet teeth, also serves to slightly withdraw the target pad from the needle point to free the target therefrom, so that further movement of the needle will not mar the target or injure the needle point.

When in operation, the casing C with its contained parts, is placed upon a pedestal or other suitable support so arranged with reference to a main target that the revolver when freed may be aimed thereat. A standard target may be used for this purpose at the standard distance, or, the same may be proportionately reduced for a lesser distance to economize space when the full range distance is not available. The sub-target D is preferably an exact reproduction of the main target but appropriately reduced.

The apparatus being locked, as shown in Fig. 1, a coin is inserted in the coin slot, causing release of the hammer catch, $d^3$. The revolver may then and not until then be cocked, which causes the release of the catch $a'$, freeing the instrument for aiming purposes, and further sets the recording devices in the position shown in Fig. 6. As the marksman now aims at the main target, the needle, which is visible through glass wall G, in the casing C, correctly reproduces the direction of the trajectory of the firearm with reference to the sub or miniature target D. When the trigger $a^7$ is pulled to imitate the act of firing, the target pad is thrown against the target to record the needle position and consequently the aim thereon, and the locking lever $g'$ is simultaneously lifted to unlock the feeding mechanism and permit through the manipulation of the feeding lever $f^{13}$, the expulsion of the record target and the introduction in its place of a fresh one for repetition of the trial.

It will be obvious that my invention is in no respect limited to the details herein shown, or to the form and arrangement of parts selected for the purpose of describing my invention, but that the latter is capable of embodiment in many forms, and moreover that various individual features herein described are as well capable of use in other combinations and other connections.

Claims.

1. A target practice apparatus having a device for aiming at a target and normally prevented from aiming movement and means dependent upon the cocking of said device to release the same for aiming movement.

2. A target practice apparatus having an aiming device for aiming at a target, means for recording the aim upon a sub-target and means for replacing the sub-target in its recording position by another.

3. A target practice apparatus having an aiming device, means to record the aim thereof and means to present to the grasp of the marksman a previously inaccessible record of the aim.

4. A target practice apparatus employing an aiming device, a sub or miniature target, a recording member to follow the aim of the aiming device over the face of the sub-target and indicate the same, and a target pad movable relatively to the target and adapted to be forced against the target to cause the record of the aim thereupon.

5. A target practice apparatus employing an aiming device, a sub or miniature target, a recording member to follow the aim of the aiming device over the face of the target but out of contact therewith and an impact member movable relatively to the target to cause contact between the recording member and target face.

6. A target practice apparatus employing an aiming device, a sub or miniature target, a target holder having retaining grooves to secure the target in recording position, a recording member coöperating with the aiming device and movable over the face of the target but out of contact therewith, and an impact member movable relatively to the target at the back of the target and adapted to force the latter against the recording member to effect a record of the aim upon the target face.

7. A target practice apparatus having an aiming device provided with a hammer a movable target pad connected to and to be moved with the hammer of such device when cocked.

8. A target practice apparatus having an aiming device, a sub-target and a recording member, a target hammer movable relatively to the sub-target and means to cause movement of such hammer to effect contact between the target and the recording member at the time of simulated firing.

9. In an apparatus of the class described, a universally mounted aiming device for aiming at a target, an indicating member to follow and indicate the aim of the aiming device and provided with mounting or supporting means to permit universal movement thereof, and disengageable means, normally in engagement with said indicating member, for imparting and directing the aim following movement thereof.

10. An apparatus of the class described having an aiming device and an indicating member following the movements of the same, a connecting member between said aiming device and said indicating member to contact with the latter on but one side, and means for pressing said indicating member into contact with said connecting member.

11. A target practice apparatus employing a sub or miniature target and provided with a target holder having parallel lateral grooves to hold the target by the lateral edges thereof and spring supporting means to hold the same in position.

12. A target practice apparatus of the class described, provided with an aiming device, following means connected therewith for following the aim thereof, a magazine holder for holding a series of similar sub-targets and means for transferring the targets to operative position.

13. A target practice apparatus of the class described, having an aiming device, following means connected therewith for following the aim thereof, a target holder, operatively mounted relative to said following means, a target magazine and means for feeding the individual targets from the magazine to the holder.

14. An apparatus of the class described having an aiming device, a follower connected therewith for following the aiming movements thereof, a target holder operatively mounted relative to said following means, a target magazine, a feeding slot connecting the said holder and magazine, and means for feeding the targets individually from said magazine into said slot.

15. A target practice apparatus having an aiming device for aiming at a main target, recording devices for recording the aim thereof upon a sub or miniature target inaccessibly located to the marksman, and means for rendering the sub-target upon which the aim has been recorded accessible to the said marksman.

16. A target practice apparatus employing an aiming device and a sub or miniature target and provided with target feeding means, and means for preventing feeding until after the firing of such device.

17. A target practice apparatus having an aiming device provided with a member that may be cocked, such as a hammer, trigger means for releasing the same, means connected with said aiming device for indicating or recording the aim thereof, and locking means governed by the cocking of said member to render said apparatus operative.

18. A target practice apparatus having an aiming device provided with a movable member adapted to be set in position for firing, indicating or recording means connected with said member, and locking means governed and actuated by the movement of said member for rendering the said indicating or recording means inoperative until after it has been set.

19. A target practice apparatus having an aiming device, a sub-target, means for recording the aim upon the sub-target and sub-target feeding means.

20. A target practice apparatus employing an aiming device, a sub-target, aim recording means, a sub-target magazine, and means for transferring the sub-target from said magazine into position for record.

21. A target practice apparatus having a target magazine, an aiming device, recording means including a follower to follow the aim of said aiming device, and means for transferring a target from said magazine to its recording position.

22. A target practice apparatus provided with an aiming device, an indicating or recording member governed thereby, a rotary target magazine adapted to hold a plurality of targets, and means for successively engaging and presenting said targets in operative position relative to said member.

23. A target practice apparatus having an indicating needle and guiding finger to direct its movement, and a spring tending to throw said needle constantly toward said guiding finger.

24. A target practice apparatus having an indicating member yieldably deflected in one direction and a guiding member to deflect the movement of said indicating member in the opposite direction.

25. A target practice apparatus having an aiming device, an indicating member and indicating means yieldably connected to both the aiming device and the indicating member.

26. A target practice recording apparatus comprising an aiming device for aiming at a distant object, and self-contained recording means for recording the aim thereof without the necessary issuance of any projectile therefrom, provided with a record-holder for holding a supply of fresh records, and means for successively withdrawing a record from said holder and placing the same in recording position to receive the record of the aim of said device at the time of simulated firing.

27. In an apparatus of the class described the combination with an aiming device adapted for simulated firing, of follower means for following the aiming movement thereof, recording means coöperating with said follower means and locking means for said recording means rendered operative on the simulated firing of said aiming device.

28. In an apparatus of the class described the combination with an aiming device having firing mechanism, follower connections to follow the movement of said device, recording means for recording the aim thereof, and means for locking said firing mechanism after the firing thereof.

29. In an apparatus of the class described the combination with an aiming device adapted for simulated firing of target feeding mechanism and means rendering the same inoperative until after simulated firing.

30. In an apparatus of the class described the combination with an aiming device of target feeding means and means for opposing retrograde movement of the feeding mechanism.

31. A target practice apparatus having a device for aiming at a target and normally prevented from aiming movement, and means dependent upon the preparation of said device for firing to release the same for aiming movement.

32. A target practice apparatus having an aiming device for aiming at a target, an indicating member for indicating the aim thereof, guiding means for directing the movement thereof, and means tending to press the indicating member toward the guiding means while permitting withdrawal of the latter from the former.

33. A target practice apparatus having an aiming device for aiming at a target, an indicating member for indicating the aim thereof, and means connecting the indicating member to the aiming member, said means being yieldably connected to the aiming device and disengageably connected to the needle.

34. A target practice apparatus having an aiming device, an indicating member for indicating the aim thereof, a guiding member having a depression or recess for engagement with said indicating member, and means normally pressing said indicating member into said recess, but permitting withdrawal of said guiding member therefrom.

35. A target practice apparatus having an aiming device, an indicating or recording needle connected to follow the aim thereof, and means permitting its disengagement from the needle when it is given an extreme upward movement.

36. A target practice apparatus having an aiming device, a follower, and a connecting member between the aiming device and the follower, permitting the withdrawal of the connecting member from the follower on extreme movement of the aiming device in one direction, and the yielding of the connecting member relatively to the aiming device on extreme movement of the latter in the opposite direction.

37. A target practice apparatus having an aiming device, a follower, a connecting member between the follower and the aiming device, and means permitting the unseating of the connecting member relatively to the aiming device on extreme movement of the latter in a given direction.

38. A target practice apparatus having an aiming device, follower means for recording the aim of said aiming device, target holding means, and means for ejecting a target from said target holding means.

39. A target practice apparatus having an aiming device provided with a hammer, following means adapted to follow the aiming movement of said device, and recording means to coöperate with said following means for recording the aim of said device, said recording means being connected with and actuated by the said hammer.

40. In an apparatus of the class described, the combination with an aiming device, of recording mechanism adapted to record the aim thereof upon a secondary target, means for feeding subtargets to an operative position upon said recording mechanism, and means automatically to control said feeding means.

41. A target practice apparatus of the class described having an aiming device, follower means for recording the aim of said aiming device, target holding means, a target holding magazine, and means for feeding targets from said magazine to the said holding means.

42. A target practice apparatus of the class described comprising in combination an aiming device, target holding means, a target holding magazine, feeding walls for guiding a target from said magazine to said holder, and means for transferring the targets individually from the magazine to said guiding walls.

43. A target practice apparatus provided with an aiming device and a sub or miniature target, and target feeding means operable only after the firing of such device.

44. In a target practice apparatus of the class described, the combination with an aiming device adapted to be aimed at a main target, of subtarget holding means for holding a subtarget upon which the aim may be recorded, and subtarget feeding means.

45. A target practice apparatus having an aiming device, a support upon which said device is mounted for universal movement, a gyratory needle, means yieldably connecting said needle and said aiming device permitting excess movement of the latter without corresponding movement of the former, and a means intermediate said support and said connecting means to limit the movement of the latter and permitting the unseating of the same from the aiming device on excessive movement of the latter.

46. In an apparatus of the class described, the combination with an aiming device adapted for simulated firing, following means for following the aiming movement thereof, recording means coöperating with said following means, with locking means for said recording means rendered operative on the simulated firing of said aiming device, means for releasing said locking means in preparation for simulated firing, means for feeding a target to recording position, and means for rendering said releasing means inoperative during the action of said feeding means.

47. In an apparatus of the class described the combination with an aiming device and follower means, of target feeding apparatus comprising a feeding member, and locking devices connected therewith for preventing target feeding prior to simulated firing but permitting it immediately thereafter.

48. In an apparatus of the class described the combination with an aiming device and follower means, of target feeding mechanism comprising feeding devices and controlling means therefor, including a double ratchet device and a pawl adapted for alternate engagement with the ratchets thereof, one ratchet opposing relative movement between the same and the pawl in one direction and the other ratchet in the opposite direction, and means for causing the said pawl separately to engage with said ratchets.

49. In a target practice apparatus of the class described, the combination of an aiming device, oscillatory target feeding mechanism adapted to undergo a complete oscillation on the feeding of each target, and ratchet and pawl mechanism for preventing retrograde feeding movement.

50. In a target practice apparatus of the class described the combination with an aiming device and aim recording means, of oscillatory target feeding mechanism adapted to undergo complete oscillation on the feeding of each target, mechanism for preventing retrogression on the forward feeding movement, means for shifting said mechanism at the completion of the forward feeding movement or preventing retrogression on the return feeding movement, said mechanism being left at the completion thereof in position to prevent further feeding movement, means rendered operative in preparation for using said aiming device for shifting said mechanism and simultaneiusly and positively to lock said feeding mechanism against movement, and means acting on simulated or other firing of said aiming device to unlock the feeding mechanism.

51. In an apparatus of the class described employing an aiming device and aim recording means, the combination with target feeding mechanism, of means rendered operative preparatory to using said aiming device for positively locking said mechanism against feeding movement, and means acting on a simulated or other firing to unlock the same.

52. In an apparatus of the class described employing an aiming device and aim recording means, the combination with target feeding mechanism, of a target support, and locking means for said feeding mechanism operably connected to said target support.

53. A target practice apparatus having an aiming device, an indicating or recording member, and means adjustably connected with both the latter and said aiming device for causing the same to follow the aim of the aiming device.

54. In a target practice apparatus, an aiming device, having supporting means to permit universal movement thereof for aiming the same, a gyratory indicator, and means connected with said aiming device having a V shaped finger to straddle said indicator and cause it to follow the aim of said aiming device.

55. In a target practice apparatus, an aiming device, a gyratory arm on which said aiming device is mounted, a gyratory needle, and a follower movable with said arm having a laterally extended arm provided with a crooked finger having an open engagement with said needle for causing it to follow the aim of said aiming device.

56. In a target practice apparatus, an aiming device, a gyratory arm on which said aiming device is mounted, a gyratory needle, and a follower movable with said arm comprising a rod $b$ having a laterally adjustable finger $b'$ yieldingly to engage said needle.

57. In a target practice apparatus, an aiming device, a gyratory arm on which said aiming device is mounted, and a follower rod yieldingly seated thereon to permit excessive movement of said aiming device relative thereto.

58. In a target practice apparatus, an aiming device, a gyratory arm on which said aiming device is mounted, a gyratory member, a follower rod connected therewith and said aiming device and having adjusting means to give predetermined direction to said rod and thereby to said member.

59. In a target practice apparatus, a gyratory aiming device, an indicating member, and a follower rod yieldably connected with said aiming device at one end and at the other with said member having means for separately effecting adjustment of its connections with and relative to said aiming device and said member.

60. In a target practice apparatus, an aiming device, a gyratory arm on which said aiming device is mounted, gyratory means for indicating or recording the aim of said aiming device and including a follower having an oscillatory needle connected therewith, said follower being seated on said arm to move therewith to cause the needle to follow the aim of said aiming device, and means for adjusting said follower in its seat to vary the position thereof and said needle.

61. In a target practice apparatus, a casing, a gyratory arm mounted thereon, an aiming device carried by said arm, a resetting rod connected therewith, a locking device on said arm, a catch on the casing normally engaged by the latter to prevent aiming movement of said aiming device until the latter is cocked or otherwise set in position for use, and means, intermediate said locking device and said rod and actuated by the setting movement of the latter, for releasing the former and thereby said aiming device.

62. In a target practice apparatus, an aiming device having a hammer adapted to be cocked, a recording device to follow the aim of the aiming device, a subtarget, a support therefor; and means connected with said hammer and said support and actuated by the release of the latter to effect relative movement of said support, the subtarget, and said recording device to effect a record of the aim at the time of the release of said hammer.

63. In a target practice apparatus, an aiming device having a hammer adapted to be cocked, a target hammer, and a resetting rod connected with said hammers to effect simultaneous movement of one with the other.

64. In a target practice apparatus, a target support $d$ having a target pin $d'$, a target hammer $d^2$, an aiming device having a member adapted to be set preparatory to use and released upon actual or simulated firing, and means connected therewith and with said target hammer $d^2$ to actuate the latter upon release of said member from its set position.

65. In a target practice apparatus, a gyratory arm $a$, a follower rod $b$ having a cross pin $b^6$, adapted to be seated on said arm, and an adjusting point $b^7$ for varying the relative position of said rod and said arm when said pin is seated thereon.

66. In a target practice apparatus, a follower rod, a right angular extension or finger $b'$, and an adjustable connection between same and said rod, said finger $b'$ having a crooked or V shaped end adapted to engage the shank of an indicating member.

67. A target practice apparatus having an aiming device for aiming at a target, means for recording the accuracy of the aim upon a subtarget, a target magazine, and target feeding means for feeding targets from said magazine into operative position relative to said recording means and presenting the target upon which a record has been made to the grasp of the marksman.

68. In a target practice apparatus an aiming device for aiming at a target, means for recording the aim thereof upon a subtarget, and means for ejecting the record member from the apparatus and presenting the same in convenient position to be grasped by the marksman.

69. In a target practice apparatus, an aiming device, an indicating device for following and indicating the aim of the aiming device and guiding means connected with said device and effective within a predetermined area of movement of said aiming device for directing the movements of the latter, said means having provision to permit actual disengagement with one or both of said devices upon movement of said aiming device beyond said predetermined area and to resume engagement and control the movement of said indicating device upon movement of said aiming device to and within said predetermined area.

70. A target practice apparatus of the class described, having an aiming device, target holding or supporting means, a target holding magazine, a target magazine adapted to hold a plurality of separated or individual targets, and means for singly and successively feeding said individual targets from said magazine and placing them in operative position upon said target holding or supporting means.

71. A target practice apparatus, having an aiming device, target holding means, and means controlled by the actuated or simulated firing of said aiming device for ejecting a target from said target holding means.

72. In a target practice apparatus, an aiming device, a gyratory arm on which said device is mounted, a following device to follow the aim of said aiming device, and means intermediate and connecting said devices for imparting following movement to said following device and including a disengageable connection with one of them to permit extreme movement of one relative to the other.

73. In a target practice apparatus of the class described, an aiming device, a gyratory arm on which the latter is mounted, a relatively movable tilting member carried by said arm, and a follower mounted on said member and movable therewith.

74. In a target practice apparatus of the class described, a tilting member $b^6$, a gyratory arm $a$ on which said member is mounted, and a connected spring normally to maintain said member seated on said arm to cause it to move therewith.

75. In a target practice apparatus of the class described, a gyratory arm $a$ having a tilting member $b^6$ mounted thereon and provided with a distance pin $b^7$ for adjusting the same relatively to said arm.

76. In a target practice apparatus of the class described, an aiming device, a recording member, a rotary target magazine having means for holding a plurality of individual targets and means for rotating it to bring said targets successively to feeding position, a target holder support in juxtaposition to said magazine and having guide walls to be engaged by the targets as they are successively brought to feeding position by the rotation of said magazine, and reciprocatory target feeding means for transferring the targets from their feeding position on said magazine through said guide walls into recording position on said holder.

77. In a target practice apparatus of the class described, employing an aiming device, the combination with reciprocatory target feeding mechanism adapted to undergo a complete reciprocation on the feeding of each target, of ratchet and pawl mechanism for preventing retrograde feeding movement.

In testimony whereof, I have signed my name to this specification, in the presence of two subscribing witnesses.

HENRY H. CUMMINGS.

Witnesses:
 Thomas B. Booth,
 Frederick L. Emery.